United States Patent
Hui et al.

(10) Patent No.: US 10,777,062 B2
(45) Date of Patent: Sep. 15, 2020

(54) WEARABLE DEVICE

(71) Applicant: BCE INC., Verdun (CA)

(72) Inventors: Tony Hui, Thornhill (CA); Jagdip Grewal, Verdun (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 16/228,622

(22) Filed: Dec. 20, 2018

(65) Prior Publication Data

US 2019/0197864 A1 Jun. 27, 2019

Related U.S. Application Data

(60) Provisional application No. 62/609,188, filed on Dec. 21, 2017.

(51) Int. Cl.
| G08B 21/04 | (2006.01) |
| G08B 21/02 | (2006.01) |
| G08B 25/01 | (2006.01) |

(52) U.S. Cl.
CPC ..... *G08B 21/0453* (2013.01); *G08B 21/0277* (2013.01); *G08B 21/0283* (2013.01); *G08B 21/043* (2013.01); *G08B 25/016* (2013.01)

(58) Field of Classification Search
CPC ....... H04W 4/00; H04W 4/005; H04W 4/025; H04W 4/22; H04W 11/04; H04W 36/32; H04W 60/00; H04W 60/06; H04W 64/00; H04W 4/02; H04M 1/72538; H04M 1/72541; H04M 1/72572; G08B 21/02; G08B 21/023; G08B 21/0277; G08B 21/0283; G08B 21/04; G08B 21/0453; G08B 25/008; G08N 25/016
See application file for complete search history.

(56) References Cited

U.S. PATENT DOCUMENTS

| 2013/0162160 | A1* | 6/2013 | Ganton | H05B 45/37 315/210 |
| 2014/0266776 | A1* | 9/2014 | Miller | A61B 5/0002 340/870.01 |
| 2016/0007176 | A1* | 1/2016 | Moisanen | H04W 4/90 455/404.1 |
| 2017/0080236 | A1* | 3/2017 | Karl | A61B 5/746 |
| 2017/0118591 | A1* | 4/2017 | Fournier | H04W 4/021 |
| 2017/0169699 | A1* | 6/2017 | Will | G08B 21/0461 |
| 2017/0238129 | A1* | 8/2017 | Maier | H04W 4/14 455/404.2 |
| 2019/0200168 | A1* | 6/2019 | Stapleford | A61N 1/3904 |

* cited by examiner

Primary Examiner — Van T Trieu

(57) ABSTRACT

A wearable device may monitor one or more parameters of a wearer and enter an emergency state based on the values of the monitored parameters. When in the emergency state, the wearable device may connect to a low-power wide area network and transmit an alert to a remote monitoring location.

19 Claims, 13 Drawing Sheets

WEARABLE DEVICE

TECHNICAL FIELD

The present disclosure relates to a wearable device, and in particular to a wearable device that can monitor user parameters.

BACKGROUND

Wearable devices may have functionality to measure, monitor, and/or report parameters of a user. Examples of such wearable devices include Fitbit™, Apple Watch™, Life Alert™, etc. However, the usefulness of some wearable devices may be inhibited by a short battery life, particularly for long-term monitoring situations such as those involving the elderly, where the wearable device may have to be recharged every few days. Many of these wearable devices are also not able to independently connect to a cellular network and often require to be 'paired' with other devices or must communicate by alternative means, which may inhibit the device's ability to communicate with remote devices, respond to an emergency, etc. As such, the functionality of existing wearable devices is limited.

Accordingly, systems, devices, and methods that enable an additional, alternative, and/or improved wearable device remains highly desirable.

SUMMARY

In accordance with an aspect of the present disclosure, there is provided a method of sending an emergency alert from a wearable device, comprising: measuring at least one parameter associated with a user of the wearable device while the wearable device is not connected to a network; determining an emergency condition based on whether a parameter of the at least one measured parameter corresponds to a triggering condition of that parameter; and when the emergency condition is determined: connecting the wearable device to a low-power wide area network; and transmitting the emergency alert to a remote location over the established connection to the low-power wide area network.

The above-described method may further comprise, while the wearable device is connected to the low-power wide area network: measuring the at least one parameter associated with the user of the wearable device; and transmitting the at least one measured parameter to the remote location over the established connection to the low-power wide area network.

The above-described method may further comprise: determining if the emergency condition has ended based on whether each of the at least one measured parameter corresponds to an acceptable condition of each of the at least one measured parameter; and when the emergency condition has ended, disconnecting the wearable device from the low-power wide area network.

The above-described method may further comprise: determining a location of the wearable device and transmitting the location to the remote location over the established connection to the low-power wide area network.

In the above-described method, the parameter may comprise a location determined by the wearable device.

The above-described method may further comprise determining the emergency condition if a user input is received.

The above-described method may further comprise: connecting with an external measurement device over a short range communication network at a predetermined time interval; receiving at least one parameter from the external measurement device associated with the user of the wearable device; and determining the emergency condition based on whether a received parameter of the at least one received parameter corresponds to a triggering condition of that received parameter.

In the above-described method, the external measurement device may be configured to continuously broadcast connection information and the wearable device is configured to automatically connect to the device when the connection information is detected at the predetermined time interval.

In the above-described method, if no emergency condition is determined, the wearable device may disconnect from the short range communication network and the external measurement device.

The above-described method may further comprise: determining a notification condition based on whether the parameter of the at least one measured parameter corresponds to a pre-determined notification condition of that parameter; and when the notification condition is determined, providing a notification alert to the user of the wearable device.

The above-described method may further comprise: storing data of the at least one measured parameter on the wearable device; determining whether a measurement update is necessary based on a pre-determined update condition for providing the measurement update; when the measurement update is determined to be necessary: aggregating the data of the at least one measured parameter stored on the wearable device; connecting the wearable device to the low-power wide area network; transmitting the aggregated data to the remote location over the established connection to the low-power wide area network; disconnecting the wearable device from the low-power wide area network; and deleting the data of the at least one measured parameter on the wearable device.

In accordance with another aspect of the present disclosure, there is provided a wearable device, comprising: a network interface for connecting the wearable device to a low-power wide area network; one or more sensors for measuring parameters associated with a user of the wearable device; a processor; and a memory storing instructions which when executed by the processor configure the wearable device to: measure at least one parameter of the user with the one or more sensors while the wearable device is not connected to a network; determine an emergency condition based on whether a parameter of the at least one measured parameter corresponds to a triggering condition of that parameter; and when the emergency condition is determined: connect the wearable device to the low-power wide area network; and transmit an emergency alert to a remote location over the established connection to the low-power wide area network.

The above-described wearable device may further comprise a GPS receiver, wherein the processor is configured to turn on the GPS receiver to determine a location of the wearable device.

The above-described wearable device may further comprise a user interface through which user input triggering the emergency condition can be received.

The above-described wearable device may further comprise a speaker through which audio messages can be played to the user.

The above-described wearable device may further comprise a LED indicator light comprising one or more LEDs.

In accordance with yet another aspect of the present disclosure, there is provided a system for monitoring a user, comprising a wearable device and a measurement device.

The wearable device comprises: a network interface for connecting the wearable device to a low-power wide area network, and for connecting the wearable device to a short range communication network; a processor; and a memory storing instructions executable by the processor. The measurement device is configured to: measure at least one parameter associated with the user of the wearable device; connect with the wearable device over the short range communication network; and transmit the at least one parameter to the wearable device over the short range communication network. When the instructions stored in the memory of the wearable device are executed by the processor, the wearable device is configured to: connect with the measurement device at a predetermined time interval over the short range communication network; receive the at least one parameter from the external measurement device associated with the user of the wearable device; determine an emergency condition based on whether a parameter of the at least one received parameter corresponds to a triggering condition; and when the emergency condition is determined: connect the wearable device to the low-power wide area network; and transmit an emergency alert to the remote location over the established connection to the low-power wide area network.

In the above-described system, the measurement device may be configured to continuously broadcast connection information and the wearable device is configured to automatically connect to the device when the connection information is detected at the predetermined time interval.

In the above-described system, if no emergency condition is determined, the wearable device may disconnect from the short range communication network and the measurement device.

In accordance with still yet another aspect of the present disclosure, there is provided a method of responding to an emergency alert, comprising: receiving an emergency alert from a remote device; determining a response action based on the emergency alert; and transmitting an emergency message to a contact in accordance with the response action.

The above-described method may further comprise: generating alert information comprising information associated with the emergency alert; and storing the alert information in a storage location accessible through a user portal.

The above-described method may further comprise: transmitting a response to the remote device that the emergency alert has been received and response action has been performed.

The above-described method may further comprise: receiving at least one measured parameter from the remote device, the at least one measured parameter associated with a user of the remote device; and storing data of the at least one measured parameter received in a storage location accessible through a user portal.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
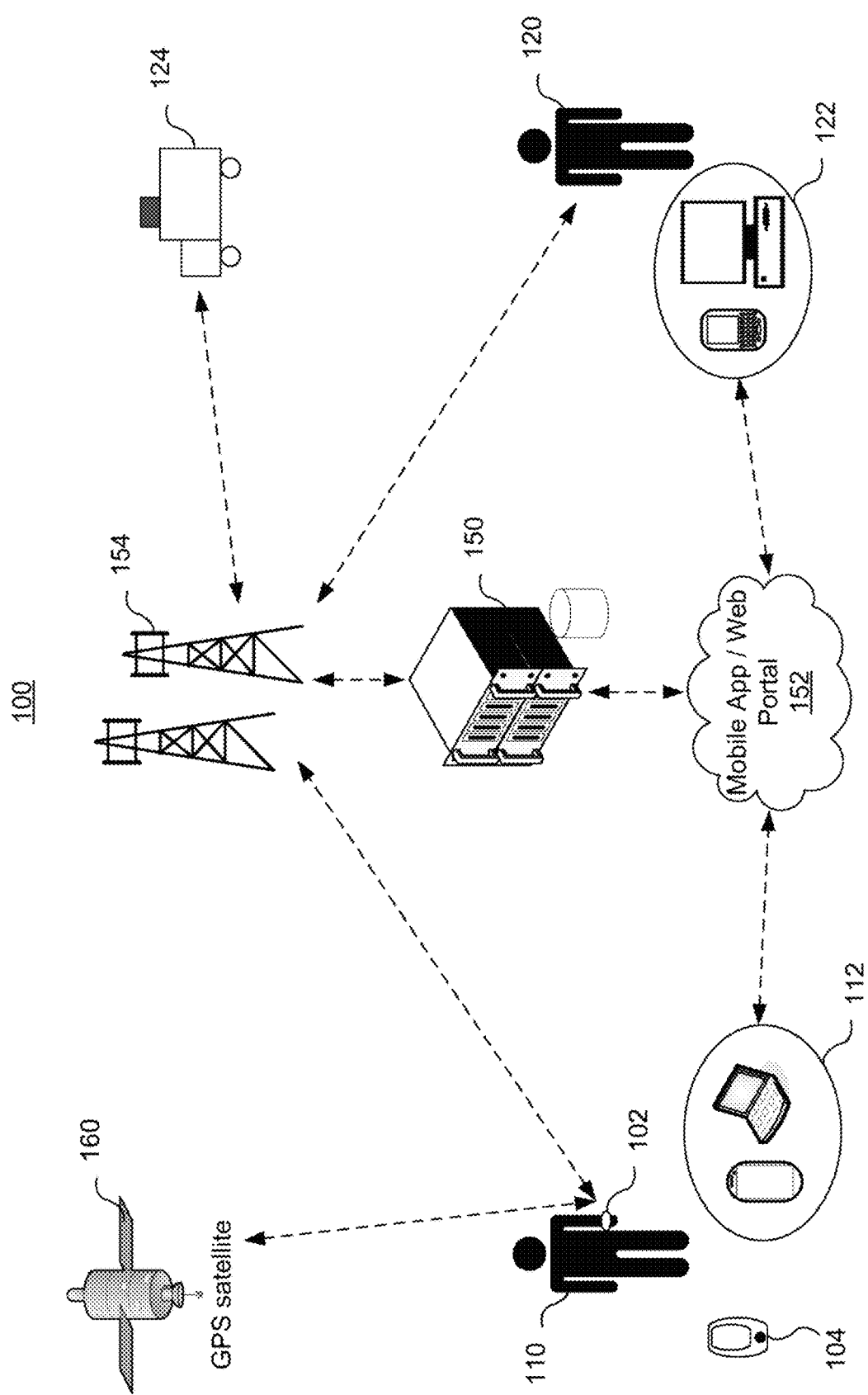
FIG. 1 shows a system for sending an emergency alert from a wearable device.

A wearable device is described that is uses a low-power wide area network connection to communicate emergency alerts to a remote location when a particular triggering event occurs. The wearable device may continuously monitor user parameters; however, the low-power wide area network connection remains off until a triggering event requiring sending of an emergency alert has occurred. Once the low-power wide area network connection establishes a communication channel, an emergency alert can be sent informing other individuals or systems of the triggering condition. The wearable device may provide a relatively simple user interface, for example using LEDs rather than a full display to reduce power consumption, so that the wearable device may monitor the user for a long period of time without requiring the wearable device to be removed for recharging.

The present disclosure provides methods and systems of a wearable device capable of measuring/monitoring parameters of a user associated with the wearable device using one or more sensors such as heart rate, temperature, altimeter, accelerometer, fall detection, and other sensors. The wearable device may also use a GPS receiver to determine the user's location. The measurement of user parameters may be performed in a low power state where the wearable device is not connected to any network (e.g. cellular, Wi-Fi™, Bluetooth™, etc.). Based on the measured parameters, the wearable device may determine different states or conditions of the user and perform associated actions. For example, in a normal or acceptable condition, no alerts or notifications may be generated. In a notification state, which may correspond to measured parameters indicative of elevated risk to the user but not an emergency, the wearable device may for example provide a notification to the user. In an emergency condition, which may correspond to measured parameters indicative of a possible or actual emergency, the wearable device may connect to a wide area network using the low-power wide area network connection and send an emergency alert to a remote location.

The wearable device may determine an emergency condition based on whether a parameter corresponds to a triggering condition, which may be a pre-selected value specific to that parameter for the user that is indicative of an emergency. If an emergency condition is determined, the wearable device may connect to a low-power wide area network such as a narrowband LTE network using Mobile IoT (M-IoT) technologies which are based on 3GPP standards, and send an emergency alert to a remote location. The emergency alert may be sent to a caregiver, emergency response service, etc., or may be sent to an emergency response server which may in turn send an emergency message to the caregiver, emergency response service, etc. The wearable device may also comprise an SOS button and an emergency condition may also be triggered/initiated by the user of the wearable device pressing an SOS button of the wearable device.

If the wearable device includes a GPS receiver, the wearable device may only turn on its GPS receiver at pre-determined time intervals to conserve power. During an emergency condition, the GPS receiver may be turned on to provide real-time location tracking. Measured parameters, including location tracking, may be stored locally at the wearable device and transmitted to a remote location in accordance with pre-determined settings. User preferences, measured parameters, notification conditions, triggering conditions, emergency conditions, emergency contacts, etc., may be configured through a mobile app or web portal accessible by the user of the wearable device and/or a caregiver of the user.

The wearable device may be in the form of a smart bracelet further comprising a speaker, LEDs, SOS button, and more. The above configuration of the wearable device, as will be further described herein, allows the wearable device to conserve battery power by performing most of its functionality in a low power state and only connecting to the low power wide area network when necessary.

While a 'smart bracelet' is referred to throughout this description as an exemplary form of the wearable device, it is noted that the disclosure is not limited to such. A person of skill in the art will readily appreciate how elements and features described herein may be applied to various kinds of wearable devices, Internet of Things (IoT) devices, and any kind of connected device in general. Furthermore, while the smart bracelet is described as being configured to operate in accordance with the narrowband IoT (NB-IoT) or the LTE-M standards, a person of skill in the art will appreciate that elements and features described herein may be applicable to other technology standards, such as any other standards within the M-IoT suite of technologies that support low power wide area applications, without departing from the scope of this disclosure. Further still, while the smart bracelet features may be described with reference to use cases by a certain demographic or social group, it is noted that these are for exemplary purposes only and that the smart bracelet may be used in other cases without departing from the scope of this disclosure.

Embodiments are described below, by way of example only, with reference to FIGS. 1-13.

FIG. 1 shows a system 100 for sending an emergency alert from a wearable device. The wearable device is shown in the system 100 of FIG. 1 as a smart bracelet 102, though as previously noted the wearable device is not limited to such. A user 110 may wear the smart bracelet 102 to monitor various parameters of the user 110, as will be further described below. The smart bracelet 102 may be configured to comply with NB-IoT or LTE-M standards when connecting to a network, as will also be further described below. The smart bracelet 102 may comprise user-interfacing hardware components including but not limited to: an emergency or SOS button, LED lights, a speaker, etc. User input may be received through the emergency or SOS button. The smart bracelet 102 may further comprise hardware including but not limited to: a battery, sensors, a GPS receiver, a motor for causing vibrations, a network card/interface, a memory, non-volatile storage, and a processor, the processor capable of executing instructions stored on the memory. These components help to provide the smart bracelet 102 with various functionality and capabilities as described further herein such as sending emergency alerts, receiving notifications, measuring user parameters (for example, heart rate), measuring environmental parameters (for example, temperature), determining a location of the device, etc. The smart bracelet 102 may furthermore be waterproof, shockproof, freezeproof, and the like. The smart bracelet 102 may or may not be easily removable by the user 110.

The smart bracelet 102 may be purchased from various outlets and configurable by the user 110 or, for example, a caregiver 120 of the user 110. The user 110 may configure the smart bracelet 102 by accessing a mobile app/web portal 152 (referred to more simply as "app portal 152" herein). The app portal 152 may be hosted and supported by a server. The server supporting the app portal 152 may be, or may be in communication with, an emergency response server 150, with information stored in a database associated with the emergency response server 150. In FIG. 1, communication is shown between the app portal 152 and the emergency response server 150 directly, however information exchanged between the app portal 152 and the emergency response server 150 may be transmitted through one or more intermediary servers, such as in the case where a server hosting the app portal 152 is different from the emergency response server. The app portal 152 may be accessed over the Internet by a connected device 112 of the user 110 or a connected device 122 of a caregiver 120 of the user 110 for example. In this instance, the app portal 152 may be hosted on a web page. An application may also be downloaded and installed on a connected device 112 and/or connected device 122. The app portal 152 may be able to push notifications to the application installed on the connected device 112 and/or the connected device 122. As depicted in FIG. 1, the connected device 112 and/or connected device 122 may for example be a mobile phone or a laptop computer, though it is not limited to such.

When configuring the smart bracelet 102, the user 110 or the caregiver 120 may be directed to press and hold the SOS button for a given number of seconds in order to turn the smart bracelet 102 on. At the app portal 152, the user 110 or the caregiver 120 may be prompted to enter the smart bracelet International Mobile Equipment Identity (IMEI) number or serial number of their band. As previously described, the smart bracelet 102 may provide functionality that can monitor various parameters of the user 110 and environment, record measurements, determine notification/emergency conditions, and send emergency alerts. The user 110 or the caregiver 120 may also be guided through a step-by-step process to gather user and contact information, determine preferences, and determine triggering conditions that could result in an emergency condition.

User preferences selected within the app portal 152 may include inputting how frequently to check the location of the user 110, setting a geofence location(s), turning on/off the heartrate monitor or other sensors and setting a range of acceptable values, turning on/off the temperature monitor and setting a range of acceptable values, SOS button functionality, etc. An emergency condition may be determined as a condition when a parameter does not coincide with a range of acceptable values/conditions (also referred to herein as a 'triggering condition'). However, the term "value" is not limited to its strictest definition. For example, the smart bracelet 102 may monitor a pulse, and if the shape of the pulse does not match an acceptable pulse shape, this may be a triggering condition indicative of an emergency condition. Notification conditions may also be configured at the app portal 152, which may correspond to parameter values that do not necessarily constitute an emergency but could lead to an emergency.

Emergency response actions may also be inputted in the app portal 152, which outlines how to respond to emergency conditions. Part of configuring the response actions may include listing emergency contacts. The response action may also be different for different types of emergency conditions. For example, if the smart bracelet 102 determines an emergency condition after detecting that the user 110 has fallen, the response action may be to notify the caregiver 120. Alternatively, if the smart bracelet 102 determines an emergency condition after detecting that the user's heartrate has increased to 180 beats per minute, the response action may be to call emergency response services 124 such as an ambulance.

Preferences for how the smart bracelet 102 responds to notification and emergency conditions may also be configured at the app portal 152. For example, if the user 110 goes 2 m outside of a geofence, corresponding to a notification condition, the smart bracelet 102 may be configured to turn on a yellow LED light and read a message to the user 110 over the bracelet's speaker, for example: "We have seen that you have left your predetermined location setting. If this is a false alarm, please press and hold the SOS button for 3 seconds until the green light flashes and you feel a vibration." Alternatively, if the user 110 goes more than 5 m outside of a geofence, corresponding to a triggering condition of an emergency condition, the smart bracelet 102 may be configured to turn on a red LED light and read a message to the user 110 over the bracelet's speaker, for example: "We have seen that you have left your predetermined location setting. An emergency alert notification has been sent to your emergency contacts. If this is a false alarm, please press and hold the SOS button for 3 seconds until the green light flashes and you feel a vibration."

Various configurations and preferences may be implemented without departing from the scope of this disclosure. The smart bracelet 102 configuration may also have default settings and/or some settings that are not changeable. Various parameters may be measured by the smart bracelet 102 depending on the smart bracelet's components and as such, parameters, preferences of parameters, triggering conditions corresponding to parameters, etc., described herein are for exemplary purposes only and are non-limiting.

All or a subset of the information, preferences, notification conditions, emergency conditions, and triggering conditions may be stored in the database associated with the emergency response server 150. All or a subset of the information, preferences, notification conditions, emergency conditions, and triggering conditions may also be stored on the smart bracelet 102. The smart bracelet 102 may receive/retrieve the information, preferences, and triggering/emergency conditions selected at the app portal 152 in various ways, for example by physically (e.g. USB port) or wirelessly (e.g. Bluetooth™) connecting the smart bracelet 102 to the connected device 112 with access to the app portal 152. While the above configuration process at the app portal 152 is described as being performed before using the smart bracelet 102 for the first time, the app portal 152 may be visited at any time to add/update/delete such information, preferences, and parameter conditions.

The app portal 152 may also be accessible by a caregiver, relative, friend, etc. (hereinafter referred to simply as "caregiver" 120). The caregiver 120 may similarly access the app portal 152 over the Internet by a connected device 122, shown in FIG. 1 as a mobile phone or desktop computer for the sake of example but not limited to such. The caregiver 120 may access the app portal 152 via a mobile app, web page, etc., and may be prompted for authorization or sign-on information. The caregiver 120 may be able to see all or a subset of information stored at the emergency response server 150 associated with the user 110. The caregiver 120 may be able to see all or a subset of information for a plurality of users of smart bracelets 102. A person skilled in the art will appreciate that authorization for a caregiver 120 to access information related to a user 110 may be established in various ways known in the art, and accordingly will not be described herein.

In use, the smart bracelet 102 may measure various parameters of the user 110 and their environment in a state where the smart bracelet 102 is not connected to any network (e.g. cellular, Wi-Fi™, Bluetooth™, etc.). By not being connected to a network, the smart bracelet 102 is able to conserve power and therefore prevent frequent recharging of its battery. Parameters may be measured through one or more sensors located within the smart bracelet 102, and the parameters may include but are not limited to: user heart rate, pulse, body temperature, etc., as well as environment temperature, altitude, etc.

At pre-determined time intervals (i.e. based on the preferences/settings configured by the user 110 at the app portal 152), the smart bracelet 102 may turn on location services and receive satellite data, e.g. from GPS satellite 160, and determine the location of the user 110. Alternatively, because the smart bracelet 102 is configured to comply with NB-IoT or the LTE-M standards, the user's location may be determined by connecting to a low-power wide area network using cellular telecommunications bands, and triangulating the location of the smart bracelet 102 using cellular towers 154. Additionally or alternatively, the smart bracelet 102 may use SSID or Wi-Fi™ beacons to track location and determine if more exact locations are required. For example, instead of turning on location services at pre-determined time intervals, the smart bracelet 102 may instead search for an available Wi-Fi™ connection. In an example the Wi-Fi™ connection may correspond to the user's home, and when the smart bracelet 102 determines that this Wi-Fi™ connection is now out of range it may turn on location services to determine a more precise location using GPS or network-based techniques.

The smart bracelet 102 may store measurements locally on the smart bracelet 102. Based on preferences, the smart bracelet 102 may be configured to provide measurement updates to the emergency response server 150 and/or another server and/or a local or remote communication device (e.g. a connected device 112 of the user 110 and/or a connected device 122 of the caregiver 120) at pre-determined time intervals, when the memory/storage of the smart bracelet 102 is approaching full, each time that the smart bracelet 102 turns on location services, etc. As previously described, the smart bracelet 102 may be configured to comply with NB-IoT or LTE-M standards. The measurement updates may comprise aggregating the measured parameters stored on the smart bracelet 102, connecting to a low-power wide area network such as a narrowband LTE network using cellular telecommunications bands from cellular towers 154, and transmitting the measured parameters to the emergency response server 150 over this low-power wide area network. The smart bracelet 102 may then disconnect from the low-power wide area network and delete the measured parameters from its memory/storage.

The emergency response server 150 is depicted in FIG. 1 as both being able to communicate with the smart bracelet 102 as well as hosting the app portal 152 for simplicity. However, a person skilled in the art will understand that additional servers could be implemented in the system 100, with one in communication with the smart bracelet 102 over the low-power wide area network and another for hosting the app portal 152, provided that they are communicatively coupled to transmit data between them as described above. Upon receiving the measured parameters the emergency response server 150 or a different server hosting the app portal 152 may store the data in an associated database or storage repository, which may then be accessible over the app portal 152. For example, the user 110 or caregiver 120 may be able to log into the app portal 152 and track their history of the measured parameters.

Based on the measurements of various parameters, the smart bracelet 102 may be able to determine notification conditions and emergency conditions. When the smart bracelet 102 determines a notification condition, the smart bracelet 102 may provide a notification alert to the user 110 with advisory action based on the smart bracelet's configuration as selected at the app portal 152 or by a default response in accordance with the notification condition. The time and frequency of notification conditions may also be stored in the smart bracelet's memory/storage and provided in the measurement updates.

When the smart bracelet 102 determines a triggering condition corresponding to an emergency condition for a measured parameter, or if the SOS button of the smart bracelet 102 is pressed, the smart bracelet 102 may automatically connect to the low-power wide area network. An emergency alert in accordance with the emergency condition may be transmitted over the low-power wide area network, provided by cellular towers 154 for example, to a remote location. The preferences of the smart bracelet 102 may be configured such that pressing the SOS button a pre-determined number of times is indicative of different requested response actions.

In some cases, the smart bracelet 102 may store emergency contact information and response actions locally, and the emergency alert may be transmitted over the low-power wide area network directly to the emergency contact, for example the caregiver 120, emergency response services 124, or other. In other cases, to conserve memory space on the smart bracelet 102, this information may only be stored at the emergency response server 150, for example in the database coupled with the emergency response server 150. Accordingly, the smart bracelet 102 may transmit the emergency alert over the low-power wide area network to the emergency response server 150, and the emergency response server 150 upon receiving the emergency alert can determine a response action based on a parameter associated with the emergency alert. The emergency alert may contain encoded information regarding the type of emergency condition that caused the emergency alert. The emergency response server 150 may determine the identity of where the emergency alert was sent from (i.e. what device) and what emergency condition the emergency alert corresponds to, and then access the database to determine an appropriate response action based on the preferences configured by the user 110 at the app portal 152. For example, the emergency response server 150 may retrieve the contact information for the caregiver 120 and send a text message to them indicating that the user 110 of smart bracelet 102 has had an emergency condition. The caregiver 120 may log into the app portal 152 and see the details of the emergency alert to respond accordingly.

The emergency response server 150 may be further configured to respond to the smart bracelet 102, initiating lighting of the LEDs, pre-recorded messages to be played through the speaker, and/or vibrations of the smart bracelet 102 to indicate that the emergency alert has been received and that appropriate action has been undertaken. After sending the emergency alert, the smart bracelet 102 may continue to stay connected to the low-power wide area network, because during an emergency condition conserving battery power may not be as important as the parameters that caused the emergency condition. The smart bracelet 102 may also be configured to turn on location services in the event of an emergency condition. The smart bracelet 102 may continue to measure parameters and continuously transmit them over the low-power wide area network. For example, if an emergency service such as an ambulance has been called in response to the emergency alert, the paramedics may be able to receive updated parameters of the user 110 such as heart rate, temperature, etc. as they travel to the location of the user 110.

Accordingly, the smart bracelet 102 is configured to conserve battery by measuring user 110 parameters in a low power state, and only connecting to the low-power wide area network to transmit measurements or during emergency conditions. In combination with the smart bracelet's compliance to NB-IoT or LTE-M standards, the extended battery life provided by infrequently determining location and connecting to the low-power wide area network allowable by the methods and systems disclosed herein may provide an opportunity for long-term monitoring of the user 110.

While the above description has so far referred to responding to medical conditions as uses for the smart bracelet 102, various other implementations could be considered without departing from the scope of the disclosure. For example, the smart bracelet 102 may be used to monitor prisoners or parolees, tracking their location with low power consumption and also being able to measure other parameters such as their heart rate, which may be an indication that they are using illegal substances if it becomes too high.

In another example, the system 100 may further comprise an additional external measurement device 104 that can be connected with the smart bracelet 102. The measurement device 104 may be used to monitor more specialized parameters that requires sensors not included in the smart bracelet 102 or may be too power intensive. For example, the measurement device 104 may be a blood sugar monitor intended to be used for people with Type 1 or Type 2 diabetes. The diagnostic equipment to determine blood sugar levels may be invasive and/or may not be common enough to include a standard smart bracelet 102 because not everyone may wish to monitor their blood sugar levels. The measurement device 104 may measure parameters of the user 110 and be connectable with the smart bracelet 102, for example over Bluetooth™. The measurement device 104 may continuously transmit Bluetooth™ connection information. At pre-determined time intervals, the smart bracelet 102 may search for Bluetooth™ connections, see the connection information corresponding to the measurement device 104, and establish a connection. The measurement device 104 may transmit the measured parameter(s) to the smart bracelet 102, and the smart bracelet 102 can determine if there is an emergency condition, notification condition, or the like, and respond appropriately based on configuration settings. When an emergency condition is not determined, the smart bracelet 102 may disconnect from the measurement device 104 thereby ensuring that battery life is optimally conserved. This measurement information may also be stored at the smart bracelet 102 and transmitted to the emergency response server 150 during measurement updates.

While the system of FIG. 1 depicts just a single user 110 with wearable device 102, one of skill in the art will readily appreciate that the system 100 may be used to support multiple users of multiple wearable devices.

Figure 2:
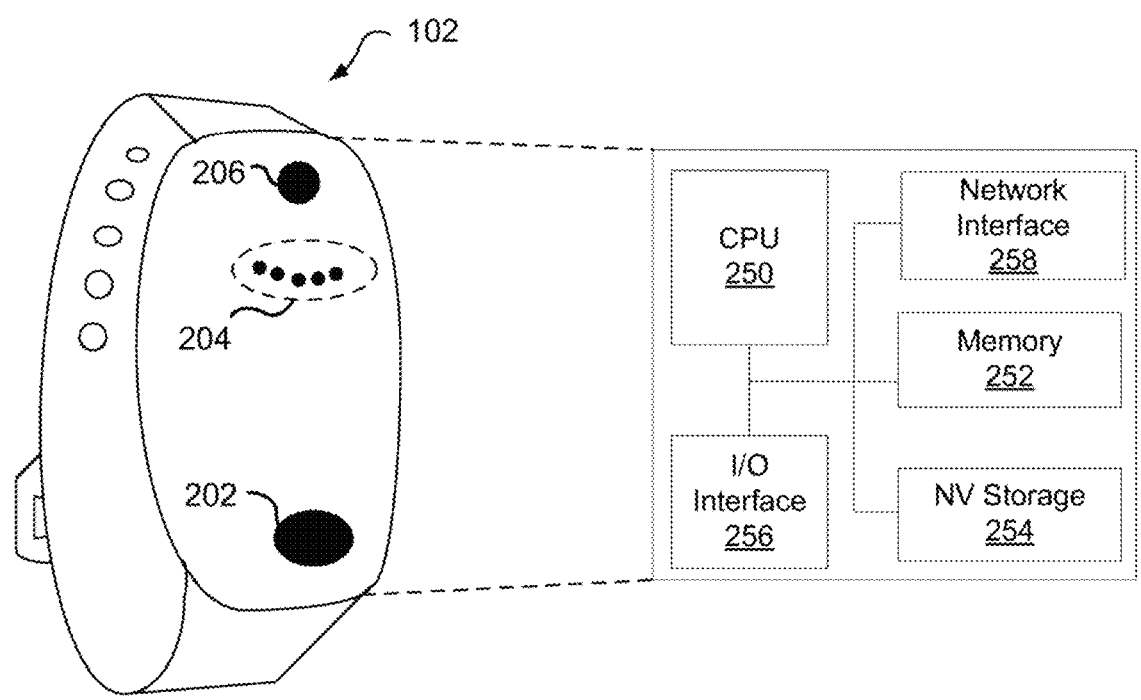
FIG. 2 shows an example of the wearable device and a hardware schematic thereof.

FIG. 2 shows an example of the wearable device and a hardware schematic thereof. As previously described, the smart bracelet 102 may comprise user-interfacing components such as an emergency or SOS button 202, a speaker positioned behind one or more recesses 204, and an LED indicator light 206.

The smart bracelet 102 may comprise further hardware components such as a processor or central processing unit 250, a memory 252, non-volatile storage 254, input/output (I/O) interface 256, and a network interface 258 operably coupled with one another. The CPU 250 may be powered by a battery of the smart bracelet (not shown). The memory 252 may contain instructions readable and executable by the CPU 250, including preferences and pre-selected conditions (acceptable conditions, notification conditions, triggering conditions, emergency conditions, etc.) that were established at the app portal 152. For example, the memory may store information regarding what constitutes a notification condition, what constitutes a triggering condition for an emergency, how to respond when an emergency condition is determined, how often to turn on location services, how often to transmit measured parameters, etc.

The input/output (I/O) interface 256 may provide an interface for various equipment (not shown) coupled with the CPU 250, including but not limited to I/O devices, sensors, a GPS receiver, etc. The I/O devices may include the SOS button 202, speaker 204, and LED indicator light 206, for example. The sensors may include, but are not limited to, a heart rate sensor, temperature sensor, altimeter, accelerometer, fall detection sensor, etc. The GPS receiver may be used for determining the location or positioning of the smart bracelet 102. The sensor and location data may be provided to the CPU 250 for processing. The non-volatile storage 254 may store the measured parameters until they are sent to the emergency response server 150 during measurement updates.

The smart bracelet 102 may comprise a network interface 258 allowing for connection and communication over the low-power wide area network. Although depicted as being connected to the CPU 250, the network interface may be connected through the I/O interface or other intermediary interfaces. As described with reference to FIG. 1, this may allow for emergency alerts and measurement updates to be provided to the emergency response server 150 and/or emergency contacts, as well as to receive messages from the emergency response server 150 and/or emergency contacts to indicate that the alert has been received, help is on the way, etc. Messages may be sent from/received at the CPU 250 through the network interface 258. Upon receiving a message, the CPU 250 may retrieve instructions from the memory 252 and can flash the LED indicator light 206 or play a pre-recorded message through speaker 204. The network interface 258 may further allow for the smart bracelet 102 to connect to short range communication networks such as Wi-Fi™ networks, Bluetooth™ networks, etc., allowing for communication with measurement devices 104, connected devices 112, etc., as described with reference to FIG. 1.

Figure 3:
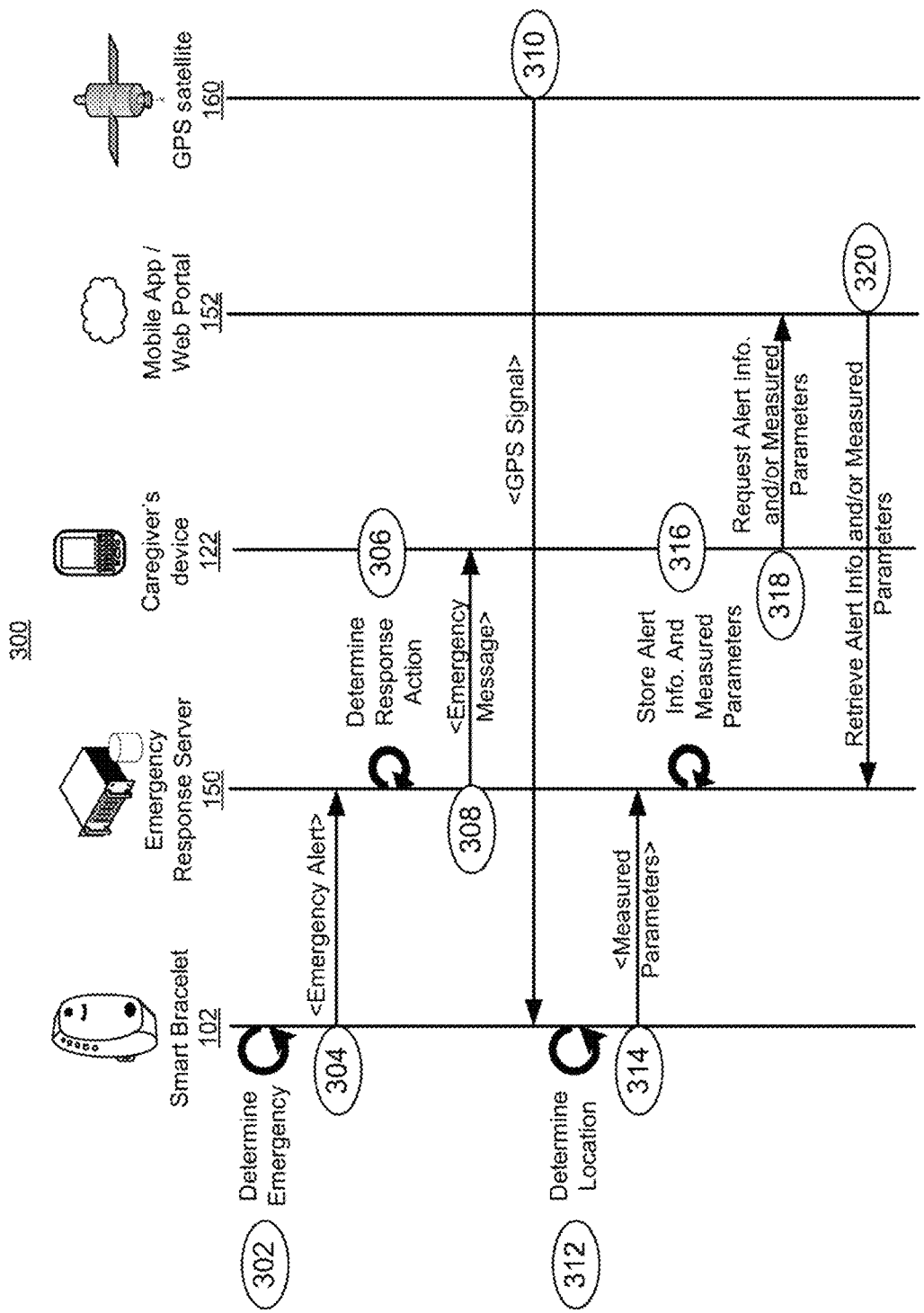
FIG. 3 shows a communication flow diagram for sending an emergency alert from the wearable device.

FIG. 3 shows a communication flow diagram 300 for sending an emergency alert from the wearable device smart bracelet 102. In the communication flow diagram 300, arrows are used to denote the direction of the communication and brackets "< >" are used to denote what is being communicated.

Smart bracelet 102 determines an emergency condition (302), for example by determining using the CPU 250 that a measured parameter corresponds to a triggering condition or that the user has pressed the SOS button. The smart bracelet 102 connects to a low-power wide area network and transmits an emergency alert to the emergency response server 150 (304), the emergency alert containing information that indicates the emergency condition which caused the emergency alert. The emergency response server 150 determines an appropriate response action (306) in accordance with the emergency condition. The emergency response server 150 may determine the appropriate response action by determining the source device of the emergency alert, accessing its database associated with the emergency response server 150, and determining the response action based on the pre-selected or default response preferences stored in the database as described with reference to FIG. 1.

The emergency response server 150 may transmit an emergency message in accordance with the determined response action (308). The emergency message may provide an indication of the user that sent the emergency alert, some of the measured parameters associated with the emergency condition, the location of the user, etc., allowing the caregiver to take appropriate action. In the communication flow diagram of FIG. 3, the emergency message is shown as being sent to the caregiver's device 122.

The smart bracelet 102 may remain connected to the low-power wide area network after sending the emergency alert. As previously described with reference to FIG. 1, the smart bracelet 102 may be configured after sending the emergency alert to turn on location services because conservation of battery power is not important during emergency conditions. The smart bracelet 102 receives a GPS signal (310), for example from GPS satellite 160, and the smart bracelet 102 can determine its location (312). The location of the smart bracelet 102 and/or other measured parameters may be transmitted to the emergency response server 150 over the low-power wide area network (314).

The emergency response server 150 may store the received measured parameters in the database associated with the emergency response server 150 and accessible through the app portal 152 (316). The emergency response server 150 may further generate alert information comprising details of the emergency alert such as when the emergency alert was received, when and to whom the emergency message was sent, etc., in addition to the measured parameters. The alert information may also be stored in the database associated with the emergency response server 150 and accessible through the app portal 152 (316). Accordingly, in this example the caregiver may access/login to the app portal 152 and request the alert information and/or measured parameters associated with the emergency alert (318), accessing the app portal 152 from the caregiver device 122 for example. The alert information and measured parameters may be retrieved from the database associated with the emergency response server 150 for display at the app portal 152 (320).

The communication flow diagram 300 is simplified for clarity and intermediate and/or alternative communications or actions are not shown. The communication flow diagram 300 is also just one of many possible implementations and is provided solely as an example. For example, the communication flow diagram 300 shows the location being determined through use of a GPS signal, however other techniques for determining the location of the smart bracelet 102 such as network triangulation using cellular towers could also be used. Also, instead of or additional to sending the emergency message to the caregiver's device 122, the emergency response server 150 may additionally or alternatively transmit the emergency message to the emergency response services. As also described with reference to FIG. 1, the emergency response server 150 may respond to the smart bracelet 102 that the emergency alert has been received and sent to the appropriate contact. In a system where the smart bracelet 102 is coupled with a measurement device 104 as described in FIG. 1, prior to determining the emergency the smart bracelet 102 may receive a measured parameter from the measurement device 104 and this is what leads to the determination of the emergency condition.

The communication flows shown in FIG. 3 may also be performed in a different order. For example, the smart bracelet 102 may determine its location immediately after determining the emergency condition, or immediately after sending the emergency alert. The location and measured parameters could be sent to the emergency response server 150 at this point before determining the response action, and accordingly such information could be used or considered by the emergency response server 150 and factored into determining the response action.

Some of the communication flows shown in communication flow diagram 300 may also be performed irrespective of determining an emergency, such as those shown as communication flows 310 thru 320. As described with reference to FIG. 1, the smart bracelet 102 may be configured to turn on location services at pre-determined times or at a condition where the smart bracelet 102 leaves a beacon's vicinity. The measured parameters may also be provided to the emergency response server 150 during pre-determined preferences of sending measurement updates. This information may be stored at the database associated with the emergency response server, and accessible by a user or caregiver through the app portal 152.

FIGS. 4 thru 8 provide various methods that may be performed by the wearable device. While the methods of FIGS. 4 thru 8 are shown as separate methods to indicate different types of functionality, a person skilled in the art will readily appreciate that these are all functions that may be performed by the wearable device and in some scenarios these methods may be executed simultaneously. Further, though the methods shown in FIGS. 4 thru 8 are shown as being performed by the smart bracelet 102, as previously described the wearable device should not be limited to such.

Figure 4:
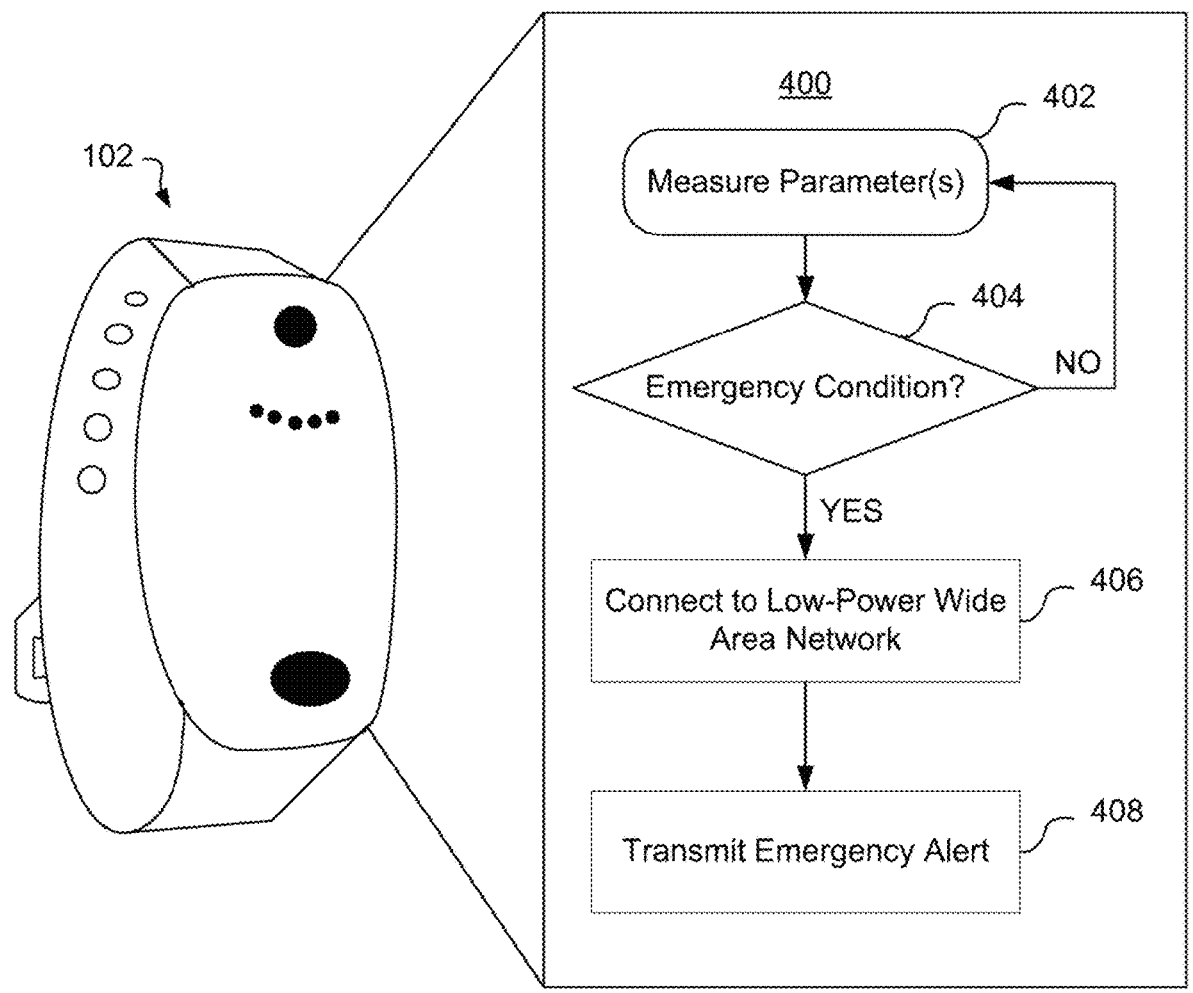
FIG. 4 shows a method performed by the wearable device for sending an emergency alert.

FIG. 4 shows a method 400 performed by the wearable device for sending an emergency alert. The smart bracelet 102 measures at least one parameter associated with the user (402), for example by using one or more sensors as previously described. The smart bracelet 102 does not have to be connected to any network (e.g. cellular, Bluetooth™, Wi-Fi™, etc.), and it may be preferred that the smart bracelet 102 is not connected to any network during this stage in order to better conserve battery power.

The smart bracelet 102 determines if there is an emergency condition (404). This determination may be based on whether a parameter of the at least one measured parameter corresponds to a triggering condition. As described with reference to FIG. 2, triggering conditions can be pre-selected at the app portal 152 and may be stored in the memory 252 of the smart bracelet 102. Alternatively, an emergency condition could be initiated by the user of the smart bracelet 102 pressing the SOS button. If an emergency condition is not determined (NO at 404), the smart bracelet 102 continues to measure the at least one parameter in a low power, unconnected state. If an emergency condition is determined (YES at 404), the smart bracelet 102 connects to the low-power wide area network (406) and transmits the emergency alert to a remote location, for example the emergency response server 150 or emergency contact, over the established connection to the low-power wide area network (408).

Figure 5:
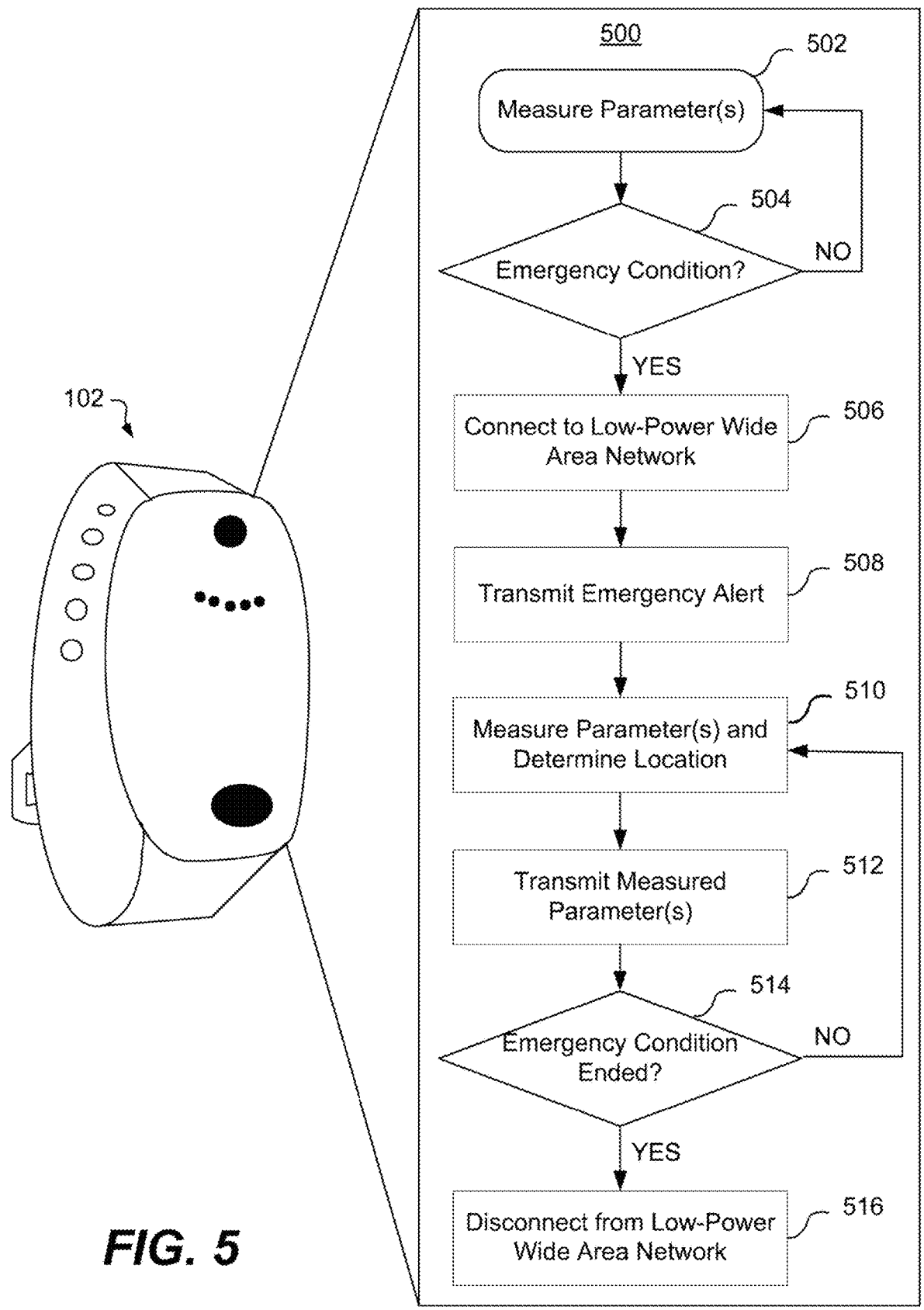
FIG. 5 shows a further method performed by the wearable device for sending an emergency alert.

FIG. 5 shows a further method 500 performed by the wearable device for sending an emergency alert. Steps 502 thru 508 of method 500 may be similar to steps 402 thru 408 of method 400 as described with reference to FIG. 0.4. The method 500 further shows that the smart bracelet 102 remains connected to the low-power wide area network after transmitting the emergency alert at step 508.

While connected to the low-power wide area network, the smart bracelet 102 continues to measure the parameter(s), and may also determine location of the smart bracelet 102 (510). The smart bracelet transmit the measured parameters (including location) to a remote location such as the emergency response server over the established connection to the low-power wide area network in real-time or at pre-determined, shortened time intervals (512). The smart bracelet 102 may also receive a response from the remote location indicating that the alert has been received (not shown).

The smart bracelet 102 determines if the emergency condition has ended (514). This may be based on a user's response at the smart bracelet 102 such as pressing the SOS button a predetermined number (e.g. three) consecutive times. The user may end the emergency condition in this manner or a caregiver or emergency personnel may end the emergency condition to stop the transmission of data once they arrive to assist the user. In some scenarios, the measured parameter that gave rise to the emergency condition may return to an accepted value and the emergency condition could end without user or caregiver intervention. If the emergency condition has not ended (NO at 514) the smart bracelet 102 may continue to measure parameters and determine the smart bracelet location (510). Additionally, when the emergency condition has not ended (NO at 514) the smart bracelet 102 may continue to transmit emergency alerts (508) (not shown). If the emergency condition has ended (YES at 514), the smart bracelet disconnects from the low-power wide area network (516). After disconnecting from the low-power wide area network, the smart bracelet 102 may perform diagnostics such as checking battery level.

Figure 6:
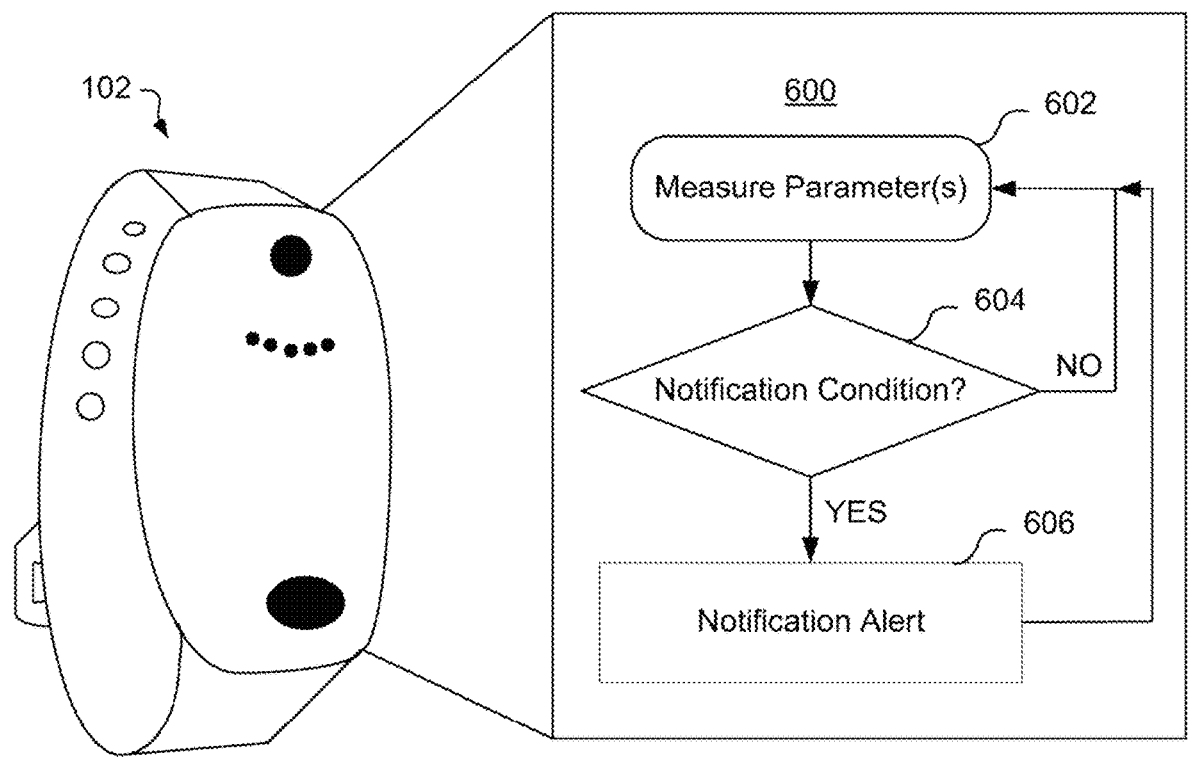
FIG. 6 shows a method performed by the wearable device for providing a notification alert.

FIG. 6 shows a method 600 performed by the wearable device for providing a notification alert. As previously described with reference to FIG. 1, a notification condition may be set as a condition that may be approaching a triggering condition for an emergency condition. The smart bracelet 102 measures at least one parameter associated with a user of the smart bracelet 102 (602) while the smart bracelet is not connected to a network (e.g. cellular, Bluetooth™, Wi-Fi™, etc.). The smart bracelet 102 determines if there is a notification condition (604) by comparing the at least one measured parameter to values for notification conditions configured at the app portal 152 and stored in the memory 252 of the smart bracelet 102.

If a notification condition is determined (YES at 604), a notification alert is provided to the user of the smart bracelet (606). The notification alert may comprise flashing or changing the colour of an LED and/or playing a pre-recorded message through the speaker of the smart bracelet 102. When a notification condition is determined the smart bracelet 102 may not connect to the low-power wide area network, providing the user with an opportunity to carry-out corrective action for the parameter that lead to the determination of the notification condition. For example, if a notification alert is sent because the user's heart rate has reached an alarming level, the user can rest and lower their heart rate if they are able to, thereby removing the notification condition. If the user cannot act to remove the notification condition, it will likely escalate to an emergency condition and the method as shown for example in FIG. 4 or FIG. 5 would be performed. By not connecting the smart bracelet 102 to the low-power wide area network when the notification condition is determined the smart bracelet 102 can conserve battery power until it is necessary (e.g. during an emergency condition).

After transmitting the notification alert the smart bracelet 102 continues to measure parameters (602) and performing determination of whether there is a notification condition (604). If a notification condition is not determined (NO at 604), the smart bracelet 102 continues to measure parameters (602) and does not provide any notification alert.

Figure 7:
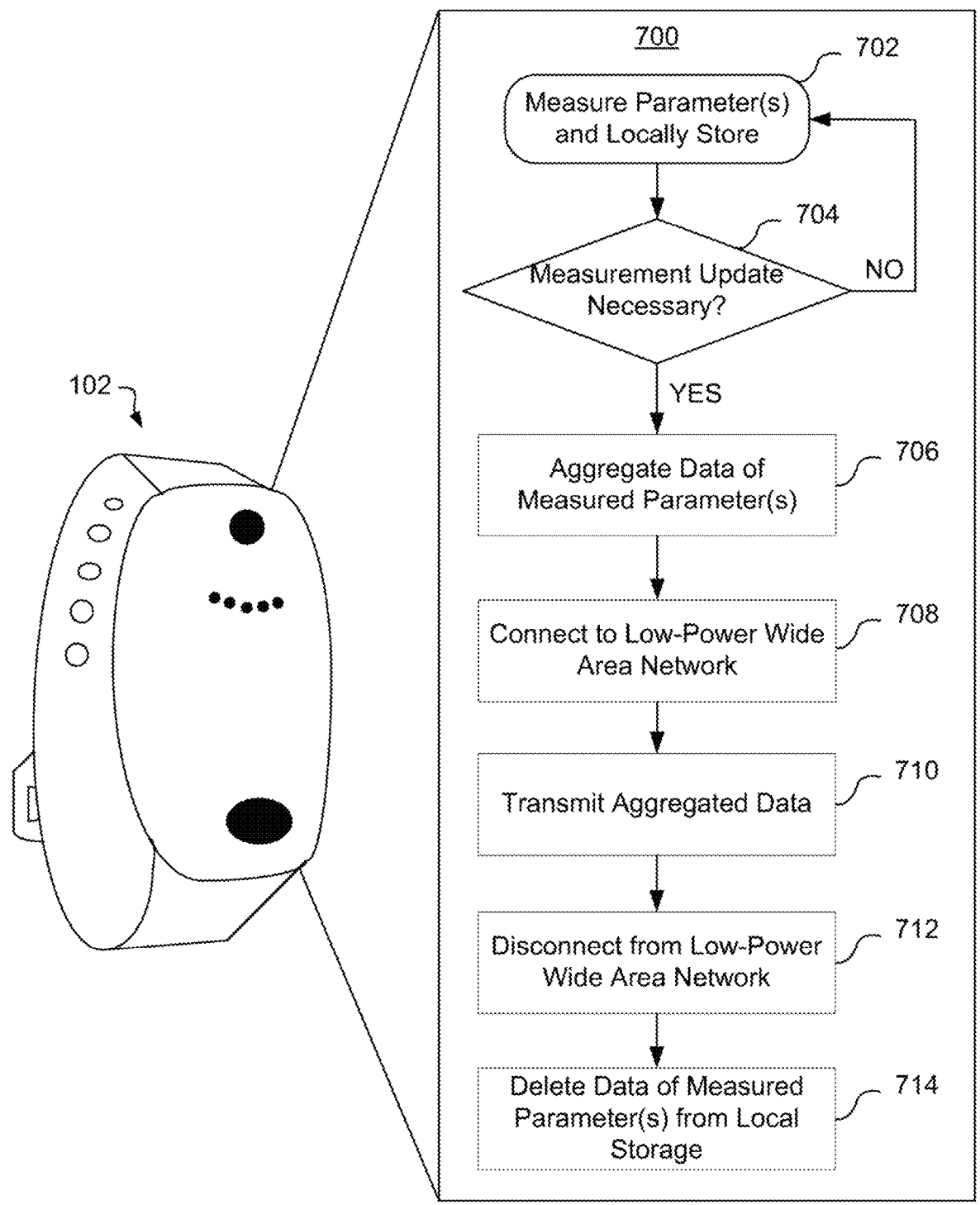
FIG. 7 shows a method performed by the wearable device for sending measurement updates.

FIG. 7 shows a method 700 performed by the wearable device for sending measurement updates. The smart bracelet 102 measures at least one parameter associated with a user of the smart bracelet 102 while the smart bracelet is not connected to a network, and may store the measurements locally, for example in non-volatile storage 254 (702). In some cases, the smart bracelet 102 may not store every point of data measured, but instead may only store averages, for example. The smart bracelet 102 may determine if a measurement update is necessary (704) based on a pre-determined or pre-selected update condition, which as previously described with reference to FIG. 1 could be at a pre-determined time period, when the non-volatile storage 254 is full, every time that the smart bracelet turns on location services, etc. If a measurement update is not necessary (NO at 704), the smart bracelet 102 continues to measure parameters and locally store the measurements.

If it is determined that a measurement update is necessary (YES at 704), the data of the measured parameters that have been locally stored by the smart bracelet may be aggregated (706) in preparation for transmittal. The aggregation of the data may only be performed after it has been determined that the measurement update is necessary in order to conserve power. The smart bracelet 102 may connect to the low-power wide area network (708) and transmit the aggregated data (710) to a remote location such as emergency response server 150 over the established connection to the low-power wide area network. The smart bracelet 102 disconnects from the low-power wide area network (712) and deletes the data of the measured parameters from the local storage (714).

Figure 8:
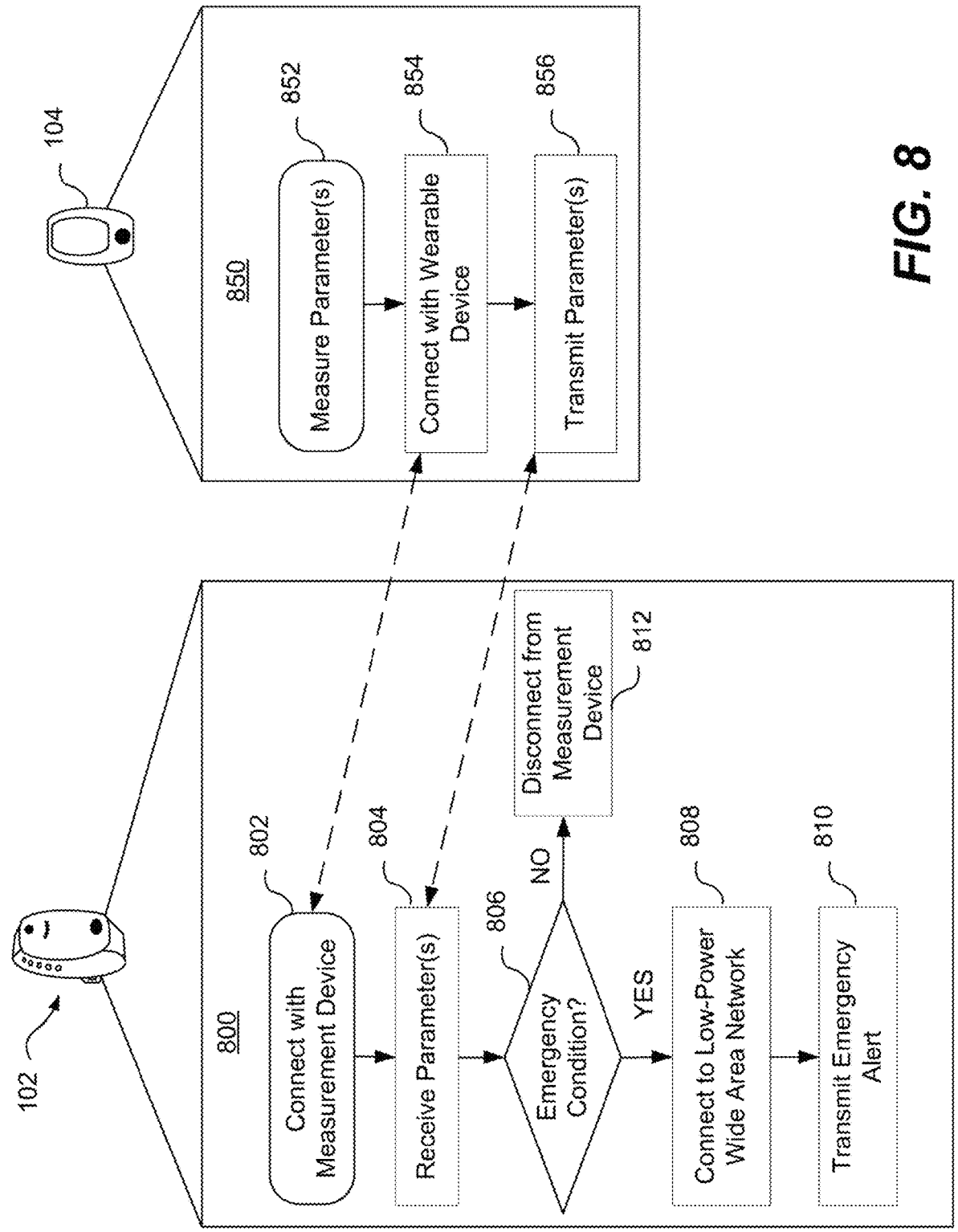
FIG. 8 shows a method performed by the wearable device and a method performed by a measurement device for sending an emergency alert.

FIG. 8 shows a method 800 performed by the wearable device and a method 850 performed by a measurement device for sending an emergency alert. As previously described, the smart bracelet 102 may perform method 800 in addition or simultaneously with performing the methods 400, 500, 600, and 700. The smart bracelet 102 connects with an external measurement device (802) at a pre-determined time interval, for example measurement device 104, and receives at least one parameter that has been measured by the measurement device 104 associated with the user (804). The smart bracelet 102 may connect with the measurement device 104 over a local connection or short range communication network such as Bluetooth™ or Wi-Fi™. The smart bracelet 102 may be configured to connect with the measurement device 104 at pre-determined time intervals configured by the user of the smart bracelet 102, for example through the app portal 152. To conserve power usage of the smart bracelet 102, the measurement device 104 may continuously broadcast its connection information and at the pre-determined time interval the smart bracelet 102 looks for such local connections.

Similar to methods 400 and 500, the smart bracelet 102 determines if there is an emergency condition based on whether a received parameter of the at least one received parameter corresponds to the triggering condition of that parameter (806). If an emergency condition is determined (YES at 806), the smart bracelet 102 may connect to the low-power wide area network (808) and transmit an emergency alert to a remote location such as the emergency response server 150 over the established connection to the low-power wide area network (810). Similar to the method 500 at steps 510 thru 516 though not shown in method 800, the smart bracelet 102 may remain connected to the low-power wide area network and measure parameters/determine the device's location and transmit the measured parameters, determine if the emergency condition has ended, etc. When coupled with the measurement device 104, if an emergency condition is determined the smart bracelet 102 may continue to receive measured parameters from the measurement device 104 for transmittal to the remote location over the established connection to the low-power wide area network in real-time or at pre-determined, shortened time intervals (not shown).

If the smart bracelet 102 determines that there is not an emergency condition based on the received parameter (NO at 806), the smart bracelet 102 disconnects from the measurement device 104 (812). The smart bracelet 102 may instead disconnect from the measurement device 104 immediately after receiving the at least one parameter from the measurement device 104, however if an emergency condition is determined after the smart bracelet 102 has disconnected from the measurement device 104, the smart bracelet 102 may have to re-connect with the measurement device 104 in order to continue monitoring the received parameter that resulted in the determination of the emergency condition. After receiving the at least one measured parameter from the measurement device 104, the smart bracelet 102 may also determine if a notification condition exists similar to method 600, and the smart bracelet 102 may store the received parameters locally on the device for providing a measurement update similar to method 700.

The measurement device 104 may measure at least one parameter of the user associated with the measurement device 104 (852), where the user of the measurement device 104 is the same as the user of the smart bracelet 102. As previously described, the measurement device 104 may be contain specialized sensors not included in the smart bracelet 102, may be battery intensive, etc., and thus the measurement device 104 may measure parameter(s) more accurately or those that are not measurable by the smart bracelet 102. The measurement device 104 connects with the smart bracelet 102 (854) and transmits the at least one measured parameter to the smart bracelet 102 (856). As also previously described, the smart bracelet 102 and measurement device 104 may connect over Wi-Fi™ Bluetooth™, etc., and the measurement device 104 may continuously broadcast its connection information. The functionality of the measurement device 104, how it collects, stores, and transmits the measured parameters, etc., may vary depending on the type of measurement device, what parameter is being measured, etc.

As will be further described with reference to FIGS. 9 thru 12, the wearable device or smart bracelet 102 may have several operational states. Some of the operational states are described below.

One operational state may be an initialization state. The smart bracelet 102 may enter the initialization after being powered up, for example. A short press of the SOS button 202 may turn the smart bracelet on.

As a non-limiting example, in the initialization state the smart bracelet 102 may flash red and blue LEDs of the LED indicator light 206 alternatively for 1.5 seconds, such as 0.25/0.5 seconds red and 0.25/0.5 seconds blue, repeating this sequence one or more times. While the LED indicator light 206 is flashing or alternatively after flashing the LEDs, network registration of the smart bracelet may occur and the smart bracelet 102 can check for network registration status. Network registration and a check for network status of the smart bracelet 102 may occur under normal power of the band.

During initialization the smart bracelet 102 may check for a SIM card. If there is no SIM card the smart bracelet may power off. Additionally, if network registration fails or if no network is available, the LED indicator light may be flashed (e.g. flashing a red LED three times at a frequency of one second) and the smart bracelet may wait a predetermined time interval (e.g. five minutes) before searching for networks and/or attempting to register the smart bracelet on the network again. If network registration is successful, the LED indicator light may be flashed (e.g. flashing a blue LED three times at a frequency of one second) to indicate to the user that the registration is successful and the smart bracelet is connected to the network.

During the initialization state the smart bracelet 102 may also activate its GPS receiver to obtain a location (e.g. latitude and longitude) of the smart bracelet. If the location cannot be obtained the smart bracelet may continue trying for a predetermined time interval or otherwise continue without its GPS location. The smart bracelet 102 may also measure parameters of the user using the various sensors, and send some or all of the following data to a remote device (e.g. the emergency response server 150): GPS latitude/longitude of the smart bracelet, battery level (e.g. as a percentage of the maximum), temperature of the user and/or environment (e.g. in degrees Celsius), heart rate of the user, etc.

After reporting the initial data to the remote device the smart bracelet may check for new configuration data, such as data defining measurement update conditions, notification conditions, triggering conditions, emergency conditions, responses to notification and/or emergency conditions, etc., that has been configured by the user and/or caregiver at the app portal 152. The configuration data may be received by the smart bracelet 102, for example through a physical connection with a connected device 112 or wirelessly. The smart bracelet 102 may download the configuration data and update the configuration data stored on the smart bracelet. The smart bracelet 102 may additionally send confirmation that the configuration data has been updated successfully.

After the initialization state the smart bracelet 102 may enter an idle state. The idle state corresponds to the state where the smart bracelet 102 is monitoring sensor data but is not connected to a network or any remote devices. The smart bracelet 102 may be in the idle state most of the time, which helps to reduce power consumption of the smart bracelet and extend the battery life. While in the idle state, the smart bracelet 102 will not communicate with remote devices over a network (the network interface module/communication module may enter a power saving mode) and will not activate its GPS receiver, or may only connect with a measurement device and/or turn on its GPS receiver to determine its location periodically at predetermined intervals.

In the idle state the smart bracelet 102 monitors the sensor data and assesses if a notification condition, triggering condition, emergency condition, etc. has occurred. The smart bracelet 102 remains in the idle state until it is time to report measured parameters, the user has pressed the SOS button 202 to initiate an emergency condition, or the sensor data indicates that a triggering condition for an emergency condition has occurred. Where a notification condition has occurred, the smart bracelet may substantially remain in the idle state, with the additional function of providing a notification alert to the user of the smart bracelet.

A normal reporting state of the smart bracelet 102 may correspond to a state in which the smart bracelet sends measurement updates. As previously described, the smart bracelet 102 may connect to the low-power wide area network at predetermined intervals (e.g. every 12 hours) as configured by the user or at default times, or when the memory is full, to send the measurement updates to a remote device. For example, the smart bracelet 102 may transmit battery level (e.g. as a percentage of the maximum), temperature of the user and/or environment (e.g. in degrees Celsius), heart rate of the user, etc.

Additionally, in the normal reporting state the smart bracelet 102 may again check for new configuration data. The smart bracelet 102 may download the configuration data and update the configuration data stored on the smart bracelet. The smart bracelet 102 may additionally send confirmation that the configuration data has been updated successfully. After the normal reporting state the smart bracelet 102 may again return to the idle state.

The smart bracelet 102 may also enter an emergency condition state corresponding to a manual activation state when the SOS button has been pressed to indicate an emergency condition, or a sensor activation state when the received sensor data is indicative of a triggering condition for an emergency condition.

For example, when the user requires immediate assistance or attention, the smart bracelet 102 may be provided with a user interface through which user input can be received to trigger an emergency condition. For example, the user may press and hold the SoS button 202 a predetermined number of times and/or a predetermined length of time (e.g. pressing and holding the SOS button 202 for longer than three seconds but less than 5 seconds). The smart bracelet 102 may then enter a manual activation state corresponding to the emergency condition state. In the manual activation state the smart bracelet 102 sends an emergency alert. The smart bracelet 102 may activate its GPS receiver to obtain a location (e.g. latitude and longitude) of the smart bracelet, and send some or all of the following data to a remote device (e.g. the emergency response server 150): GPS latitude/longitude of the smart bracelet, battery level (e.g. as a percentage of the maximum), temperature of the user and/or environment (e.g. in degrees Celsius), heart rate of the user, etc.

Further, if while monitoring the sensor data the smart bracelet 102 identifies a triggering condition for an emergency condition, the smart bracelet may enter the sensor activation state. In some instances, before entering the sensor activation state (or initially after entering the sensor activation state) the smart bracelet may wait for additional sensor data confirming the triggering condition before entering the emergency condition. When an emergency condition has been determined, the smart bracelet 102 sends an emergency alert. The smart bracelet 102 may activate its GPS receiver to obtain a location (e.g. latitude and longitude) of the smart bracelet, and send some or all of the following data to a remote device (e.g. the emergency response server 150): GPS latitude/longitude of the smart bracelet, battery level (e.g. as a percentage of the maximum), temperature of the user and/or environment (e.g. in degrees Celsius), heart rate of the user, etc.

After either emergency condition state (e.g. manual activation state or sensor activation state), the smart bracelet 102 may enter an emergency standby state until the emergency condition is corrected (for example, the user presses the SOS button 202 in a predetermined manner, the measured parameters return to a normal range, the smart bracelet is powered off, etc.). In the emergency standby state the smart bracelet 102 may remain connected to the low-power wide area network and continue to send data to the emergency response server, as previously described, until the emergency condition has ended or the power of the smart bracelet is off. The smart bracelet may be powered off by pressing and holding the SOS button 202 a predetermined number of times or a predetermined length of time (e.g. longer than five seconds), or the smart bracelet may run out of battery.

The app portal 152 allows for the configuration of information, preferences, notification conditions, emergency conditions, and/or triggering conditions for the user. As a non-limiting example only, the app portal 152 may support the configuration of heart rate and temperature monitoring intervals (for example, a default may be five minutes), a reporting interval for sending measurement updates in the idle state (for example, a default may be 12 hours), a sensor monitoring interval for receiving sensor data in the idle and/or sensor activation state (for example, sensors may check heart rate every one minute in the idle state, but in real-time in the emergency condition state), normal or expected conditions of the user (for example, normal heart rate range, a heart rate that warrants a notification alert, and a heart rate that triggers an emergency condition), a reporting interval in the emergency standby state (e.g. a default for reporting location and sensor data may be every five minutes), etc. As previously described, the configuration data defined at the app portal 152 can be used to identify notification conditions, triggering conditions, emergency conditions, appropriate responses, etc. The configuration data may thus further define how the smart bracelet 102 transitions between operational states.

FIGS. 9 thru 12 provide various additional methods that represent the transition between operational states of the smart bracelet. The methods depicted in FIGS. 9 thru 12 may represent the transitions between operational states of the smart bracelet in conjunction with the methods depicted in FIGS. 4 thru 8.

Figure 9:
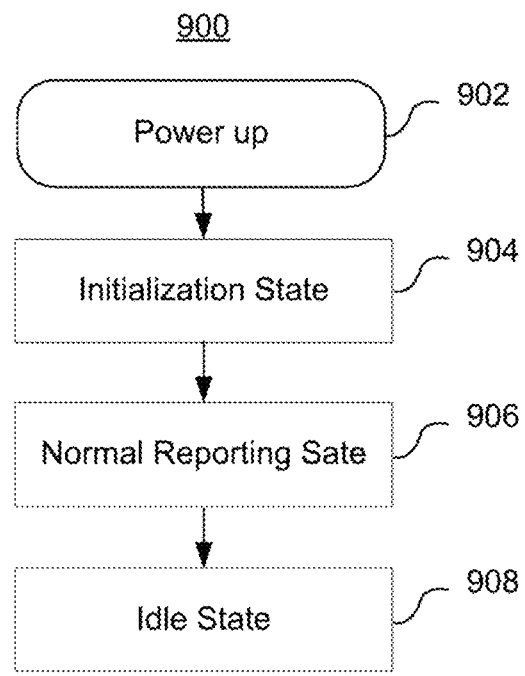
FIG. 9 shows a method performed by the wearable device during device initialization.

FIG. 9 shows a method 900 performed by the wearable device during device initialization. The method 900 may be performed in response to receiving an initial input from a user or caregiver (for example, holding the SOS button 202 of the smart bracelet 102 to turn the smart bracelet on). The smart bracelet is powered up (902). The smart bracelet enters the initialization state (904). The smart bracelet performs normal reporting in accordance with the normal reporting state (906). The smart bracelet enters an idle state (908).

Figure 10:
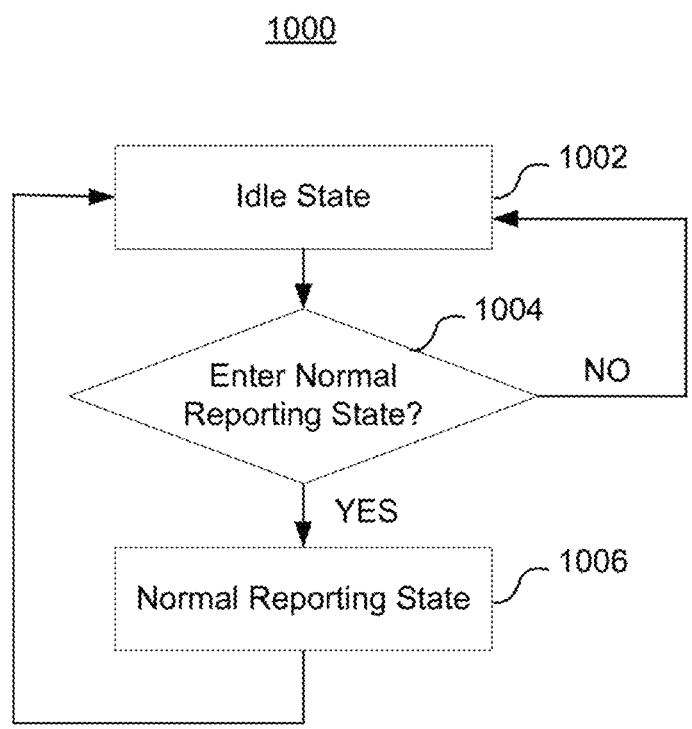
FIG. 10 shows a method of the wearable device entering a normal reporting state from an idle state.

FIG. 10 shows a method 1000 of the wearable device entering a normal reporting state from an idle state. The smart bracelet is in the idle state (1002). A determination is made if it is time to enter the normal reporting state for sending a measurement update (1004). If it is not time to report measured parameters (NO at 1004), the smart bracelet remains in the idle state (1002) and no action is performed. If it is time to enter the normal reporting state and send a measurement update (YES at 1004), the smart bracelet reports the measured parameters in accordance with the normal reporting state (1006), and subsequently returns to the idle state (1002).

Figure 11:
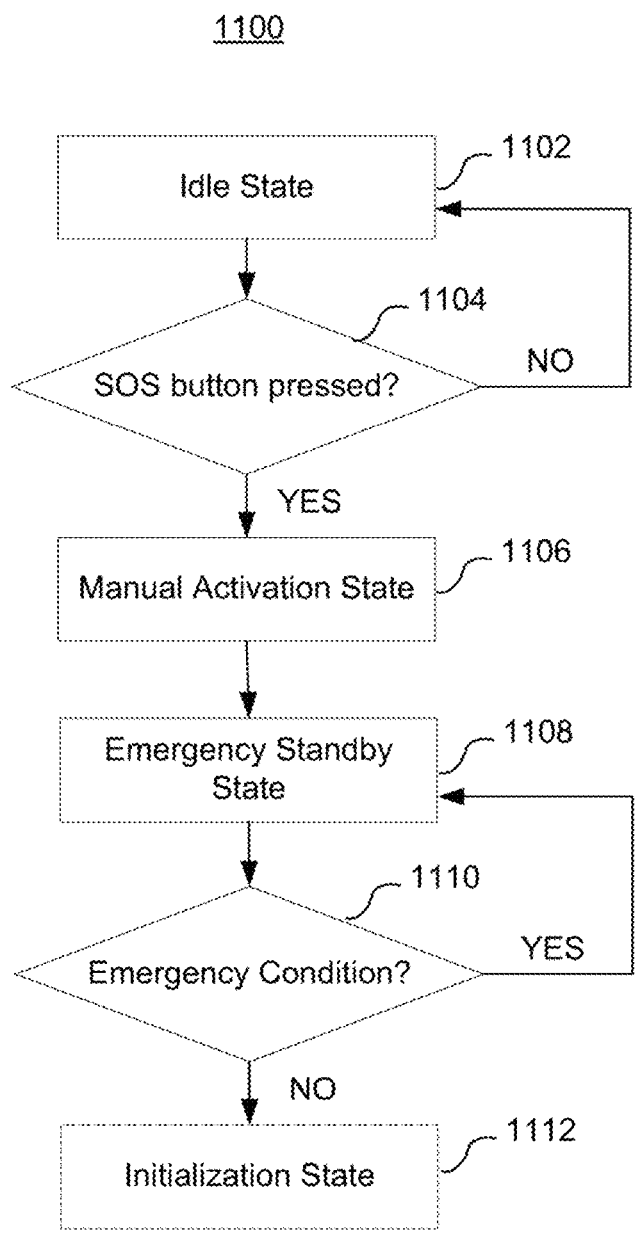
FIG. 11 shows a method of the wearable device entering a manual activation state.

FIG. 11 shows a method 1100 of the wearable device entering a manual activation state. The smart bracelet is in the idle state (1102). A determination is made if the SOS button on the smart bracelet has been pressed (1104). If the SOS button has not been pressed (NO at 1104), the smart bracelet remains in the idle state (1102) and no action is performed. If the SOS button has been pressed (YES at 1104), the smart bracelet enters a manual activation state (1106). As described above, the smart bracelet may send an emergency alert and corresponding data to the emergency response server in the manual activation state. The smart bracelet then enters an emergency standby state (1108). A determination is made if the user of the smart bracelet remains in an emergency condition (1110). If the user is still in an emergency condition (YES at 1110), the smart bracelet remains in the emergency standby state (1108) and continues to monitor the emergency condition (until the power of the smart bracelet 102 is turned off, e.g. the battery runs out). If the emergency condition has ended (NO at 1110), the smart bracelet 102 may be re-initialized and enter the initialization state (1112).

Figure 12:
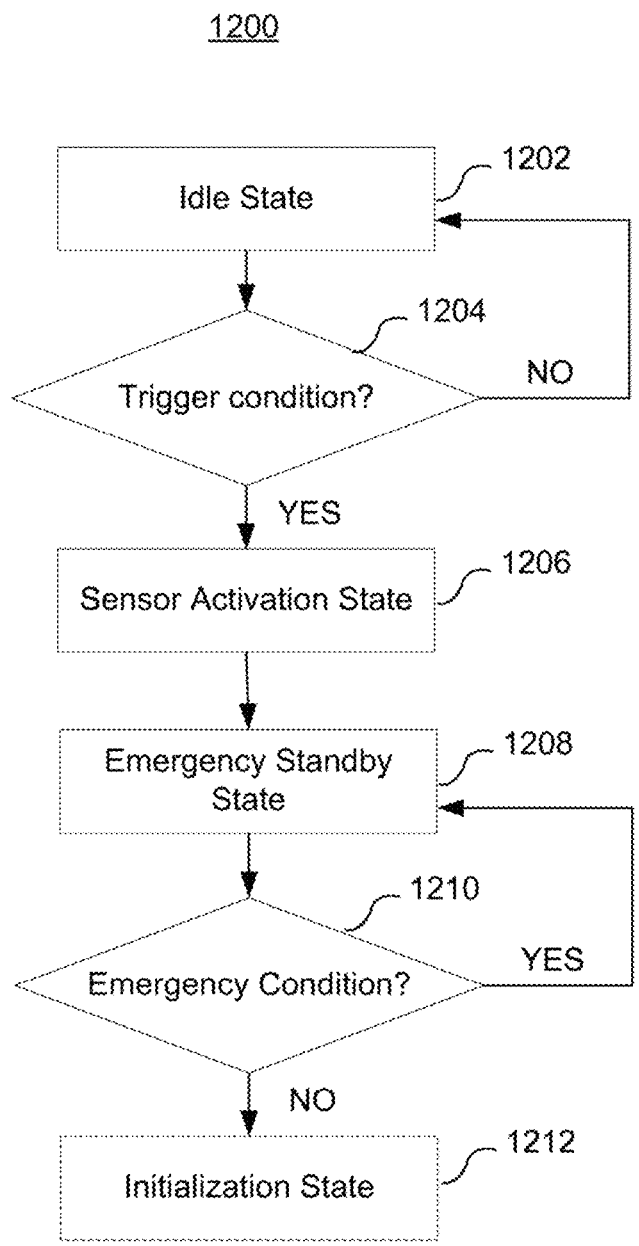
FIG. 12 shows a method of the wearable device entering a sensor activation state.

FIG. 12 shows a method 1200 of the wearable device entering a sensor activation state. The smart bracelet is in the idle state (1202). A determination is made if a triggering condition has occurred (1204), for example by monitoring received sensor data. If a triggering condition has not occurred (NO at 1204), the smart bracelet remains in the idle state (1202) and no action is performed. If a triggering condition has occurred (YES at 1204), the smart bracelet enters a sensor activation state (1206). As described above, the smart bracelet may send an emergency alert and corresponding data to the emergency response server in the sensor activation state. The smart bracelet then enters an emergency standby state (1208). A determination is made if the user of the smart bracelet remains in an emergency condition (1210). If the user is still in an emergency condition (YES at 1210), the smart bracelet remains in the emergency standby state (1208) and continues to monitor the emergency condition (until the power of the smart bracelet 102 is turned off, e.g. the battery runs out). If the emergency condition has ended (NO at 1210), the smart bracelet 102 may be re-initialized and enter the initialization state (1212).

Figure 13:
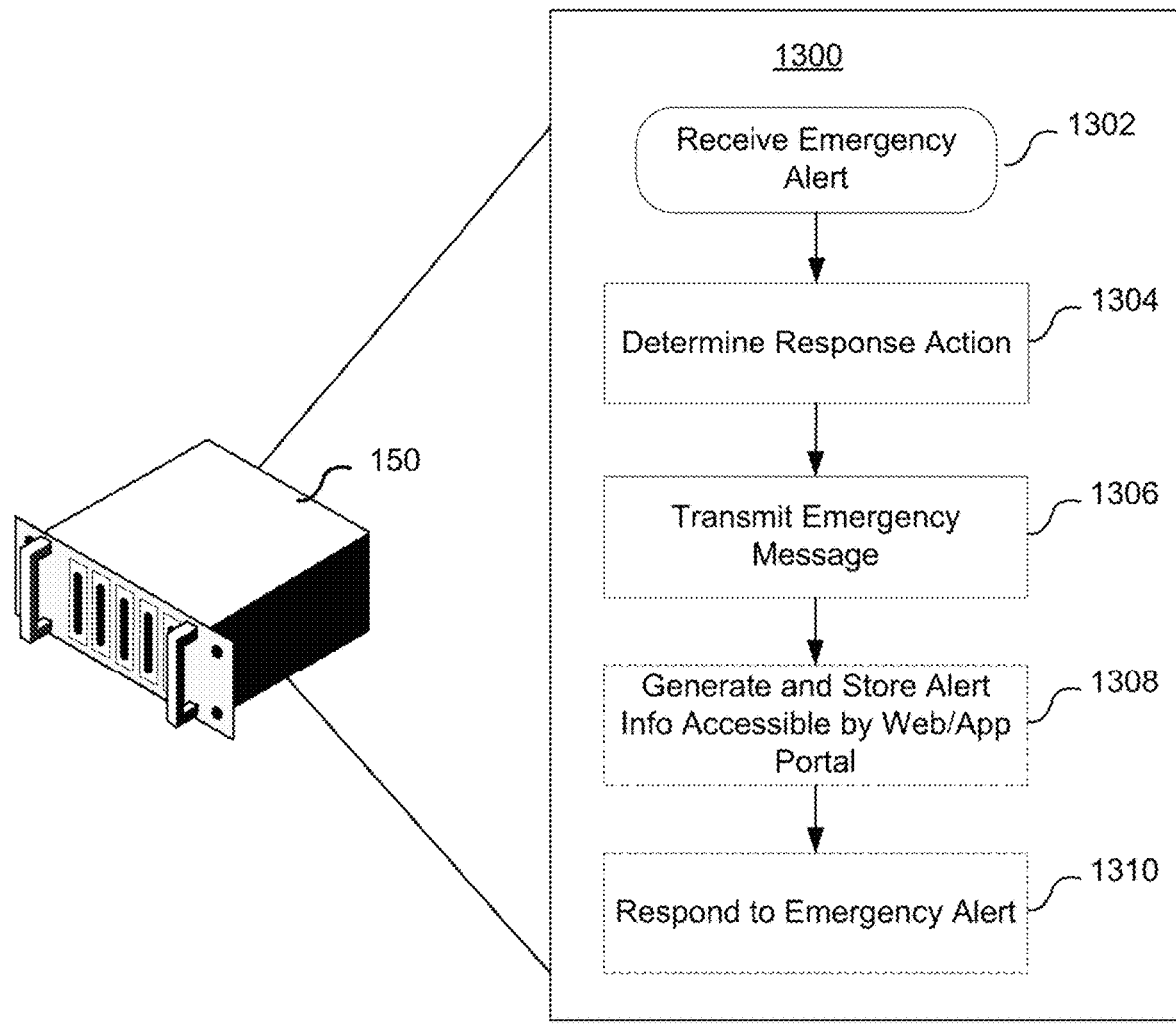
FIG. 13 shows a method performed by an emergency response server.

FIG. 13 shows a method 1300 performed by an emergency response server 150. The emergency response server 150 receives an emergency alert (1302) transmitted from a remote device such as the smart bracelet 102. As previously described with reference to FIG. 1, the emergency response server 150 may receive the emergency alert directly from the smart bracelet 102, or the emergency alert may originally be received by one or more other servers on the network and transmitted to the emergency response server 150. The emergency response server 150 may determine an appropriate response action based on the emergency alert (1304), for example by accessing the database associated with the emergency response server 150 that has stored the smart bracelet 102 parameters, preferences, emergency contacts, etc., that have been collected for that user/smart bracelet through the app portal 152. Based on the response action determined, the emergency response server 150 may transmit an emergency message (1306), for example to the caregiver, emergency response services, etc.

The emergency response server 150 may also generate and store alert information in the database associated with the emergency response server 150 (1308), where the alert information comprises details of the emergency alert received such as the time received and response taken, and wherein the alert information stored in the database associated with the emergency response server 150 is accessible through the app portal 152, for example by a caregiver. As previously described, the emergency response server 150 may also respond to the emergency alert (1310), for example by sending a message that causes the smart bracelet 102 to vibrate, flash an LED indicator, and/or play a pre-recorded message to the user to indicate that the emergency alert has been received, help is on the way, etc. The emergency response server may also further receive measured parameters from the remote device (not shown), during an emergency condition or during a measurement update for example, and storing the measured parameters (not shown) in the database associated with the emergency response server 150 and accessible through the app portal 152.

It would be appreciated by one of ordinary skill in the art that the system and components shown in FIGS. 1-13 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of sending an emergency alert from a wearable device, comprising:
   measuring at least one parameter associated with a user of the wearable device in a state where the wearable device is not connected to a network and cannot send or receive communications;
   determining whether there is an emergency condition of the user based on whether a value of the at least one measured parameter corresponds to a triggering condition of that parameter, the triggering condition stored in a memory of the wearable device; and
   when the emergency condition is determined:
      connecting the wearable device to a low-power wide area cellular network; and
      transmitting the emergency alert to a remote location over the established connection to the low-power wide area cellular network.

2. The method of claim 1, further comprising, while the wearable device is connected to the low-power wide area cellular network after determining the emergency condition:
   measuring the at least one parameter associated with the user of the wearable device; and
   transmitting the at least one measured parameter to the remote location over the established connection to the low-power wide area cellular network.

3. The method of claim 2, further comprising:
   determining if the emergency condition has ended based on whether each of the at least one measured parameter corresponds to an acceptable condition of each of the at least one measured parameter; and
   when the emergency condition has ended, disconnecting the wearable device from the low-power wide area cellular network.

4. The method of claim 2, further comprising determining a location of the wearable device and transmitting the location to the remote location over the established connection to the low-power wide area cellular network.

5. The method of claim 1, further comprising:
   determining a location of the wearable device; and
   determining the emergency condition if the location is outside of a pre-defined area.

6. The method of claim 1, further comprising determining the emergency condition if a user input is received.

7. The method of claim 1, further comprising:
   connecting with an external measurement device over a short range communication network at a predetermined time interval;
   receiving at least one parameter from the external measurement device associated with the user of the wearable device; and
   determining the emergency condition based on whether a value of the at least one received parameter corresponds to a triggering condition of that received parameter.

8. The method of claim 7, wherein the external measurement device is configured to continuously broadcast connection information and the wearable device is configured to automatically connect to the device when the connection information is detected at the predetermined time interval.

9. The method of claim 7, wherein if no emergency condition is determined, the wearable device disconnects from the short range communication network and the external measurement device.

10. The method of claim 1, further comprising:
    determining a notification condition based on whether the value of the at least one measured parameter corresponds to a pre-determined notification condition of that parameter; and
    when the notification condition is determined, providing a notification alert to the user of the wearable device.

11. The method of claim 1, further comprising:
    storing data of the at least one measured parameter on the wearable device;
    determining whether a measurement update is necessary based on a pre-determined update condition for providing the measurement update;
    when the measurement update is determined to be necessary:
       aggregating the data of the at least one measured parameter stored on the wearable device;
       connecting the wearable device to the low-power wide area cellular network;
       transmitting the aggregated data to the remote location over the established connection to the low-power wide area cellular network;
       disconnecting the wearable device from the low-power wide area cellular network; and
       deleting the data of the at least one measured parameter on the wearable device.

12. A wearable device, comprising:
   a network interface for connecting the wearable device to a low-power wide area cellular network;

one or more sensors for measuring parameters associated with a user of the wearable device;
a processor; and
a memory storing instructions which when executed by the processor configure the wearable device to:
measure at least one parameter of the user with the one or more sensors in a state where the wearable device is not connected to a network and cannot send or receive communications;
determine whether there is an emergency condition of the user based on whether a value of the at least one measured parameter corresponds to a triggering condition of that parameter, the triggering condition stored in the memory; and
when the emergency condition is determined:
connect the wearable device to the low-power wide area cellular network; and
transmit an emergency alert to a remote location over the established connection to the low-power wide area cellular network.

13. The wearable device of claim 12, further comprising a GPS receiver, wherein the processor is configured to turn on the GPS receiver to determine a location of the wearable device.

14. The wearable device of claim 12, further comprising a user interface through which user input triggering the emergency condition can be received.

15. The wearable device of claim 12, further comprising a speaker through which audio messages can be played to the user.

16. The wearable device of claim 12, further comprising a LED indicator light comprising one or more LEDs.

17. A system for monitoring a user, comprising:
a wearable device, comprising:
a network interface for connecting the wearable device to a low-power wide area cellular network, and for connecting the wearable device to a short range communication network;
a processor; and
a memory storing instructions executable by the processor; and
a measurement device configured to:
measure at least one parameter associated with the user of the wearable device;
connect with the wearable device over the short range communication network; and
transmit the at least one parameter to the wearable device over the short range communication network,
wherein when the instructions stored in the memory of the wearable device are executed by the processor, the wearable device is configured to:
remain in a state where the wearable device is not connected to a network and cannot send or receive communications;
at a predetermined time interval, connect with the measurement device over the short range communication network;
receive the at least one parameter from the external measurement device associated with the user of the wearable device;
determine whether there is an emergency condition of the user based on whether a value of the at least one received parameter corresponds to a triggering condition; and
when the emergency condition is determined:
connect the wearable device to the low-power wide area cellular network; and
transmit an emergency alert to the remote location over the established connection to the low-power wide area cellular network.

18. The system of claim 17, wherein the measurement device is configured to continuously broadcast connection information and the wearable device is configured to automatically connect to the device when the connection information is detected at the predetermined time interval.

19. The system of claim 17, wherein if no emergency condition is determined, the wearable device disconnects from the short range communication network and the measurement device.

* * * * *